2,749,322
Patented June 5, 1956

2,749,322

RESINOUS COATING

Kenneth J. Lissant, Kirkwood, Mo., assignor to Petrolite Corporation, Wilmington, Del., a corporation of Delaware No Drawing. Application May 24, 1952,
Serial No. 289,899

18 Claims. (Cl. 260—32.8)

This invention relates to certain resinous compositions useful in the production of chemically resistant coatings, and more particularly to polymerized and partially polymerized film-forming furan derivatives. These compositions possess superior resistance to certain commonly occurring corrosive media and exhibit other valuable properties, such as increased adhesion to metal surfaces and compatibility with other commonly used film-forming resins.

The present invention relates further to a new and improved method of producing certain valuable polyfuran derivatives in which the gelation point of the reaction is approached slowly, thus affording a practical control of the reaction and making possible the production of a wider range of valuable materials. These materials are particularly valuable since the reaction products in their final form may be utilized in formulations applied to a surface exposed to air where they set to form excellent protective coatings.

It is well known in the resin art that furfural, furfuryl alcohol, or mixtures of furfural and furfuryl alcohol are capable of polymerization to liquid, semi-solid, or solid products through the action of proton donor reagents. However, it is also well known that the control of this reaction for the production of useful products is difficult, since the polymerization is highly exothermic and tends to "run away" with the production of non-utilizable, infusible solids. Several methods have been attempted for the control of this general reaction, but all have had only limited success. In the case of resin cements the addition of a large proportion of a filler and the addition of the catalyst just prior to use is employed. This mixture has the disadvantage of very short "pot life" and, consequently, any catalyzed material that cannot be immediately used is wasted.

The use of a proton donor of weak activity has also been suggested. For example, instead of using strong mineral acids, weak acids such as phosphoric acid and acetic acid have been tried. Other proton donors that have been suggested are salts of inorganic acids and organic nitrogen containing compounds such as urea or its derivatives. Sulfonic acids and their salts have also been tried. All these approaches have the common fault that while they slow the reaction somewhat they do not permit it to be stopped easily nor do they give products that have desirable film forming properties.

I am aware that the addition of water to the furans as a means of stabilizing the mixture has been suggested. While this method does produce a stable monomeric mixture, it is necessary to remove substantially all the water before the polymerization can be effected. Also, the presence of residual water in the reaction product greatly reduces its usefulness as a coating component since it reduces adhesion of the film to surfaces and tends to promote "pin holing."

Another method of producing polyfuran derivatives that is known to those skilled in the art comprises mixing a catalyst with the furfural-furfuryl alcohol mixture, heating the mixture to start the reaction and, then when the desired degree of reaction is attained, suddenly cooling the reaction mass to "quench" the reaction. While this method can be employed to produce useful coating resin compositions, it has the serious disadvantage of being extremely difficult to select the exact point at which to quench the reaction. If the reaction is not stopped in time, a solid mass is produced which is useless for the purposes desired and difficult to remove from the reaction vessels. Also, if the reaction is stopped too soon the resinous product obtained lacks resistance to corrosive media. This method has the further disadvantage that the range between resins of poor resistance to corrosive media and the production of useless solids or gels is extremely narrow which further increases the difficulty in selecting the quenching point. As the reaction nears completion the rate of increase of viscosity shows very rapid growth and often the operator has only a few seconds during which to quench the reaction. This is often difficult or almost impossible in commercial scale equipment.

In the practice of the present invention a mixture of furfural and furfuryl alcohol is diluted with a ketonic solvent for this mixture such as acetone, methylethylketone, methylisobutylketone, mixtures of these ketones, or commercial mixtures of ketonic materials such as Celanese Solvent #601 which is, on a weight basis, composed of about 35 percent of methyl ethyl ketone about 20 percent of tetrahydrofuran and cyclic oxides, and about 45 percent of acetals. This liquid mixture is then caused to polymerize by the addition of a proton donor catalyst under controlled conditions of temperature until the mixture reaches incipient gelation. The reaction is then quenched by the addition of more ketonic solvent and subsequent cooling to room temperature. In the desirable embodiment of my invention the reaction temperature is maintained from about 55° C. to about 90° C. while the amount of quench should vary from about 60% to 120% by weight based on the furfural-furfuryl alcohol mixture.

By proton donor catalyst I means a material of the type mentioned in Glasstone, Textbook of Physical Chemistry, eighth printing, page 1110, lines 14 to 17: "In fact when a reaction is catalyzed by hydrogen ions all acids, in the widest sense of the term (page 957), are found to act as catalysts: This is known as general acid catalysis." Further, in the same book on page 957, the fourth line from the bottom reads "an acid should be defined as a substance having a tendency to lose a proton." A further elaboration of this term may be found in Luder and Zuffanti, Electronic Theory of Acids and Bases, page 6, the third paragraph:

"The modern one-element theory of acids and bases is usually credited to Bronsted and Lowry. They proposed the proton theory independently in 1923. But G. N. Lewis, who set forth his electronic definitions of acids and bases in the same year, also explained the proton-donor concept as a special case of his broader theory. According to the proton theory, an acid donates a proton to a base, and a base accepts a proton from an acid."

A typical list of proton donor catalysts which have been suggested for use in the polymerization of furans includes mineral acids, such as hydrochloric acid, sulfuric acid, hydrobromic acid, phosphoric acid and organic acids such as benzene sulfonic acid, acetic acid, trichloroacetic acid, and paratoluene sulfonic acid. Also included in this classification of materials are those which, while they may not in themselves possess proton donor activity, react with small amounts of water which are always present to produce proton donor groups with catalytic action. Typical examples of this type are metallic salts such as aluminum chloride, ferric chloride, lead acetate, iron pyromucate, tin chloride; mineral acid salts of urea, amines, and amides; and mineral acid halides such as the polyhalides of sulfur.

The amount of any particular catalyst which will be required will depend upon the specific catalytic activity of the material and anyone skilled in the art can readily determine the optimum amounts to be used for any particular reagent.

In determining the optimum amount of any particular catalyst to use I proceed as follows: An uncatalyzed monomeric mixture such as that described in Example VI following is prepared and divided into several aliquot portions. Varying amounts of the catalyst to be tested are added usually starting in the range from .1% and proceeding by small steps to about 3% by weight based on the furfural-furfuryl alcohol mixture. It is found that with any particular catalyst if too small an amount is used the reaction time is unnecessarily lengthened while if an excess of catalyst is used the reaction tends to become unmanageable. Usually a simple series of tests, as described above, will serve to establish the range within which a controllable reaction can be conducted in a convenient length of time. The optimum range will vary with the proton donor activity of the catalyst and also somewhat with the proportions of monomer in the basic mixture. However, anyone skilled in the art should be able to readily determine the optimum range to use.

A principal new and novel advantage of this method is that it allows a controlled and gradual approach to the higher stages of polymerization which affords clear and readily measurable means of following the course of the reaction so that it can be stopped before undesirable insoluble products are formed. The importance of this improvement over previous methods can be clearly demonstrated by an examination of U. S. Patent No. 2,571,994 to Thomas.

In this patent the polymerization of a mixture of furfural and furfuryl alcohol is brought about by the addition of an acid catalyst and the reaction is controlled solely by regulating the temperature of the reacting materials. It should be noted that rapid quenching of the reaction mixture is a vital part of the process in this patent. Further, it is stated in column 3, lines 19 to 22, that the whole process is completed in the maximum time of 30 minutes. Also, Example I elicits that "the temperature must not be allowed to exceed 275° F. or the resin will set immediately to a solid." From these considerations, it is seen that extremely careful and rapid control must be exercised in conducting the Thomas process if the formation of useless solid materials is to be avoided. In Example I of this patent, the "tempering period is usually less than ten minutes." Thus, a very short time elapses between a point in the reaction where the reaction is too incomplete to yield a useful product and a point where solid material is formed. In my new and improved method I have found that the addition of from about 15% to about 25% by weight based on the furfural-furfuryl alcohol mixture of a ketonic solvent lengthens the reaction time without otherwise adversely affecting the progress of the reaction. I have found further that the reaction can be conducted at considerably lower temperatures while still producing valuable materials.

Another primary advantage of the method of this invention is that it is not necessary to remove solvents, catalysts, or reaction by-products such as water before the resinous material may be used in final coating formulations. This is of great importance in the industrial utilization of this invention since expensive and time consuming separation steps are eliminated.

I have found that the control of the reaction by dilution with a ketonic solvent has several additional new and unexpected advantages. These ketonic materials are known to be excellent solvents for furfural and furfuryl alcohol and also for the lower polymers of these materials. They are also among the best solvents for the higher polymers of furfural and furfuryl alcohol. They are also good solvents for many of the other resins used in coating formulations such as vinylchloride polymers, coumarone-indene resins, phenolics, etc. Thus, it is not necessary to remove the solvent when the polymerization is completed before a final coating formulation is prepared. Another advantage of this method is that the boiling point of the solvent may be selected so that if the reaction tends to overheat, the refluxing of the solvent will serve as an additional safeguard in regaining control of the temperature. I have also found that the ketonic solvents when used as diluent controls in the polymerization do not adversely affect the course or extent of the reaction. They seem to have as their primary effect the reducing of the polymerization rate particularly as the degree of polymerization increases. They do not seem to destroy or inactivate the catalyst nor do they seem to act as chain terminators. These are definite and unlooked for advantages.

My method also has the further novel advantage in that it allows the use of a much wider range of mixtures of furfural and furfuryl alcohol. It has been shown previously that if undiluted mixtures of furfural and furfuryl alcohol are caused to polymerize by the addition of proton donor catalysts and the reaction controlled solely by the control of the temperature at which the reaction is conducted, it is necessary to limit the amount of furfural to from 25% to 40% of the mixture. By my new and novel method it is possible to conduct successful polymerizations with mixtures varying over a much wider range of furfural concentrations. I have found that new, useful and valuable resinous materials can be prepared from mixtures containing from 20% to 70% of furfural by weight. The polymerizations can be carried out with mixtures on either side of this range but the properties of the resulting resins are less desirable as film forming materials.

An additional advantage of my method is that if, by accident or intention, the reaction is allowed to proceed to the point of actual gelation the product is a soft friable gel which is much easier to remove from the reaction vessel than the hard solid resins produced by previous methods.

As a further development and refinement of my process I have found that the addition of from 0.5% to 10% by weight based on the furfural-furfuryl alcohol mixture of a polyvinyl acetal in the mixture prior to polymerization results in a superior product with new and unexpected properties. By a "polyvinylacetal" I mean the material produced by the reaction of an aldehyde with a polyvinylalcohol. In the usual commercial production of these materials a vinyl ester such as vinyl acetate is polymerized, and then the ester is hydrolyzed by heating the material in the presence of water and an acid to produce polyvinylalcohol. The final product varies according to the molecular weight of the polyvinylacetate and according to the degree of hydrolysis obtained. This polyvinylalcohol is then reacted with an aldehyde and the final product is generically called a polyvinylacetal. Specifically, the reaction product between polyvinylalcohol and formaldehyde is called a polyvinylformal; between polyvinylalcohol and butyraldehyde, a polyvinylbutyral; between polyvinylalcohol and furfuraldehyde, a polyvinylfurfural; and so forth. Unfortunately, the reaction product between polyvinylalcohol and acetaldehyde is specifically called a polyvinylacetal. However, this minor inconsistency is well-known to those skilled in the art and should cause little confusion. Commercially, it is also possible to produce a polyvinylacetal by the hydrolysis of a polyvinylester in the presence of an aldehyde thus passing to the final step without stopping at the alcohol stage. Other polyvinyl acetals are included in the patent and journal literature, as for example, note those disclosed and mentioned in U. S. Patents Nos. 2,188,344 and 2,194,613.

It has been suggested previously that polyvinylbutyral be added to mixtures of furfural and furfurylalcohol to give them enough viscosity to keep them in place while the polymerization is carried out in situ. Several other resins have also been suggested for this purpose. In applications of this kind the resin is used as a thickening agent to prevent the otherwise low viscosity monomeric mixture from flowing out of place before a curing action can be completed.

In my process the polyvinylacetal is used for an entirely different purpose and in an entirely different manner. I have found that if small amounts of these materials are dissolved in the mixture of fufural and furfuryl alcohol diluted with a ketonic solvent and the mixture is polymerized as previously described, the rate and course of the reaction are modified in a novel and unexpected way to produce new and valuable materials. For example, when these polyvinylacetals are used the reaction time remains long enough to permit control of the reaction, while the reaction products are taken to a higher viscosity without gelation occurring.

Since, by the use of my methods, the reaction time is extended and the approach to gelation is slower it becomes practical to follow the course of the reaction in several ways. In using previous methods the usual practice was to determine by experiment the maximum viscosity the mix could reach under the particular conditions being used without solidification. The production runs were then stopped just short of this point. Another alternative was to determine the time required for a batch to proceed to a solid under the conditions of operation, and then in future runs try to stop the reaction just short of this time. For reasons described above, neither of these methods was sufficiently precise to assure close plant control of a product.

By my new and novel method, the course of the reaction may be followed by several means. If the viscosity of the reacting material is taken at regular intervals it will be noted that both the actual viscosity and the rate of increase of viscosity change. It is desired to stop the reaction before the polymerizate becomes insoluble, but the reaction must be allowed to proceed to the point where the desirable film-forming polymers have been produced. It is a particularly advantageous property of this method that it provides a wide range over which desirable products may be obtained in contrast to previous methods which require that a very narrow range of degree of polymerization be selected.

Instead of using the viscosity of the mass as a criterion for stopping the reaction it is also possible to use a method similar to that used in the cooking of varnish. If a paddle is dipped into the liquid and a stream of the material allowed to fall from the end of the paddle, a point will be reached in the course of the reaction where, instead of the material falling in a stream and finally as discreet drops, the last of the material on the paddle will form a "string." This "string point" is a common phenomena in the kettle bodying of varnishes and one skilled in the resin art soon learns to recognize the desired condition. At this point in the reaction it is necessary to stop further polymerization or an insoluble gel stage will be reached which is undesirable.

A third method for following the course of the reaction is to withdraw a drop of the reacting material and measure the time required for the drop to form a gel when placed on a hot plate at 100° C. It has been found that when a drop of the reacting material will gel on the hot plate in less than about twenty seconds it is time to stop the reaction. This gel time will of course vary with the type and amount of catalyst used and the ratio of reactants used, but it is a simple matter for one skilled in the resin art to establish the exact point required to obtain the results desired.

The following examples are given to illustrate the novel advantages to be gained by the use of my procedures. Each of these examples was produced by the same basic method as follows:

Example I 300 g. of furfural and 300 g. of furfuryl alcohol were diluted with 125 g. of methylethyl ketone and the mixture placed in a glass resin pot equipped with a thermometer, stirrer, reflux condenser, and a glass tube with a small orifice opening below the surface of the reacting mixture. An arbitrary measurement of the viscosity of the liquid can be made by drawing some of the liquid up into the tube to a chosen height and measuring the time in seconds required for the tube to drain under gravity. If desired the tube can be calibrated with a series of liquids of known viscosity, but this is not necessary for most work.

To the mixture in the resin pot, equipped as above, catalyst was added, and the reaction was controlled at 60° C. until incipient gelation was reached. This required about 3½ hours. The reaction was then quenched by the addition of 800 g. of methylethyl ketone. When a film of this solution is applied to a steel test panel, it is found to cure in two to three hours to a tough, adherent film which shows marked resistance to many common corrosive acid or alkaline media.

Example II

The amounts and procedure of Example I were used again. 2 ml. of concentrated hydrochloric acid were used as catalyst. The initial drain time viscosity was 11 seconds. This value increased to 36 seconds after six hours of reacting. Reaction was quenched as above.

Example III

Same procedure as Example II except that 20 g. of polyvinylbutyral were dissolved in the mixture before reaction. The initial drain time viscosity was 25 seconds which increased to 114 seconds in 4½ hours.

Example IV

Same as Example II except that 20 g. of polyvinylchloride was dissolved in the mixture before reaction. The initial drain time viscosity was about 18 seconds which increased to 46 seconds in 5½ hours.

It will be noted that the reaction times in Examples I and II are very favorably extended with reference to older well-known procedures. It will be noted further that the viscosity increase in Example II, as indicated by increased drain time of the glass tube, shows an increase of about 25 units. If a reaction of the type of Example II is carried further, gelation occurs before the measurable drain time shows much additional increase. However, when the same process is repeated with the addition of a polyvinylacetal as in Example III, two unexpected results occur. First, the total time required for reaction is shortened, i. e., the reaction goes faster. However, it does not become unmanageable or revert to its here-tofore unreasonably short cycle. Second, the solution can be taken to a much higher viscosity without gelation occurring. The increase in drain time viscosity is about 89 units or over three times as much as in Example II. It is recognized that the addition of the polyvinylacetal causes an initial increase in the viscosity of the unreacted mixture, but the viscosity of the final product is out of proportion to this initial small increase. In other words, the presence of a small proportion of a polyvinylacetal has so changed the course of the reaction that a material is obtained which produces solutions of much higher viscosity before gelation. This new, novel and useful material is not to be expected from examination of the prior art.

As further evidence of the production of a new and novel substance when using the polyvinylacetals, Example IV was run in the same manner as Example III but here a polyvinylchloride resin was included in the mixture instead of the polyvinylacetal. This material, too, causes a small initial increase in the viscosity of the unreacted mixture, but it does not result in the formation of a solution of high viscosity. The increase in drain time is 28 units which is of the same order as that of Example II. In this case the resin seems to have no effect on the speed or course of the reaction and the mixture behaves in essentially the same way as it did when no resin was present.

A series of examples is now given to show other variations in specific resins, proportions, catalysts and method of selecting the quenching point. These are given by way of illustration and should not be construed as limiting the scope of the claims.

*Example V*

| | |
|---|---|
| Furfural | g 600 |
| Furfuryl alcohol | g 600 |
| Methylethyl ketone | g 250 |
| Vinylite XYHL (polyvinylbutyral) | g 40 |
| Acid (hydrochloric, conc.) | ml 2.8 | were placed in a three-necked glass flask equipped with a stirrer, thermometer and a reflux condenser. The mass was kept at 60° C. and during the course of the reaction drops of the liquid were removed and placed on a hot plate at 100° C. The time in seconds for the drop to gel was measured. When a drop of the material gelled in less than 20 seconds, the reaction was quenched by the addition of solvents as in the previous examples. The reaction time in this example was about six hours.

*Example VI*

| | G. |
|---|---|
| Furfuryl alcohol | 300 |
| Furfural | 300 |
| Polyvinylacetal (Alvar 5/80) | 20 |
| Methylethyl ketone | 125 | were mixed in a 2 liter glass beaker and heated until the resin dissolves. The mixture was then cooled to 60° C. and 3 ml. of concentrated hydrochloric acid added. An exothermic reaction ensued. The temperature was controlled at about 70° C. by external cooling. After the reaction had subsided it was necessary to heat the reaction mixture slightly to maintain the mixture at 70° C. The mixture was kept between 69° C. and 73° C. for 4½ hours. At the end of this time a portion of the material was removed and allowed to fall slowly from the end of a paddle and it showed a tendency to "string." At this time the viscosity was visibly increasing. The reaction was "quenched" by the rapid addition of 500 g. of methylethylketone and 100 g. of acetone.

*Example VII*

| | G. |
|---|---|
| Furfural | 300 |
| Furfuryl alcohol | 300 |
| Methylethyl ketone | 125 |
| Vinylite XYHL | 20 |
| Amyl acid phosphate | 4.3 | were mixed in a 2 liter glass beaker and kept at 60° C. to 62° C. for 20 hours. At this point the product started to "string." The reaction was continued for 9 hours more and by this time the viscosity had risen to the point of incipient gelation. At this point the reaction was quenched as in previous examples.

*Example VIII*

| | G. |
|---|---|
| Furfural | 275 |
| Furfuryl alcohol | 400 |
| Methylethylketone | 150 |
| Polyvinylbutyral | 30 | were placed in a resin pot equipped as in Example I. 3 ml. of concentrated hydrochloric acid were added and the reaction controlled at 60° C. After 2½ hours the drain time viscosity had risen to 117 seconds and the reaction was quenched by the addition of 700 g. of methylethylketone and 200 g. of acetone.

*Example IX*

| | G. |
|---|---|
| Furfural | 375 |
| Furfuryl alcohol | 400 |
| Polyvinyl formal | 25 |
| Methylethyl ketone | 150 | were mixed in a two liter glass beaker and heated until the resin dissolved. The mixture was then cooled to 60° C. and 3.2 mls. of concentrated hydrochloric acid added. The temperature was controlled at about 70° C. by external cooling. After the reaction had subsided the reaction mixture was maintained at 70° C. by slight external heating and kept between 69° C. and 73° C. for about six hours, at which time the material developed a tendency to "string." The reaction was then quenched by the addition of 550 gms. of methyl-ethyl ketone and 200 grams of acetone.

*Example X*

| | |
|---|---|
| Methylethylketone | g 256 |
| Polyvinylalcohol (P. V. A. RH–491) | g 30 |
| Furfural | g 30 |
| Concentrated hydrochloric acid | ml 4 | were placed in a 3 liter glass beaker and stirred at 80° C. The polyvinyl alcohol was insoluble at first but gradually dissolved forming a thick smooth gel. At this point,

| | G. |
|---|---|
| Furfural | 500 |
| Furfuryl alcohol | 500 | were added. The mixture was again heated to 80° C. and stirred. The gel dissolved slowly and a smooth viscous solution was produced. After reacting for three hours the mixture was quenched as in previous examples.

When it is desired to proceed immediately to the production of a finished coating formulation, such other resins as may be required may be dissolved in the ketonic solvent used as a quenching agent. Plasticizers, stabilizers and pigments may then be added and the final coating composition finished by conventional means.

A typical procedure for the pilot scale production of coating formulations is as follows:

*Example XI*

| | G. |
|---|---|
| Methylethylketone | 6000 |
| Methylisobutylketone | 1500 |
| Vinylchloride polymer | 750 |
| Coumarone-indene polymer | 150 |
| Drying oil | 525 | were placed in a 20 gallon stainless steel jacketed, open kettle, equipped with a propeller type agitator, and the mixture stirred and heated until the solids were dissolved. This solution was then cooled and transferred to a separate container. This solution was called mix A. The open kettle was then recharged with:

| | G. |
|---|---|
| Furfural | 2200 |
| Furfuryl alcohol | 2300 |
| Polyvinylacetal resin | 150 |
| Methylethylketone | 975 |

The mixture was heated and stirred until the resin had dissolved. It was then cooled to below 60° C. and 24 ml. of concentrated hydrochloric acid added. The mixture was kept at a temperature between 60° C. and 70° C. by admitting cooling water or steam to the jacket as necessary. A paddle was dipped into the reacting mixture from time to time and when the last drops of material in falling from the paddle formed a "string," the reaction was quenched by the addition of mix A, above. The reaction time in this example was about three hours.

This material was then finished by the addition of pigment and stabilizers to produce a coating composition of the final properties desired. The amount and kind of pigment will depend on the color desired and on the method of application of the coating formulation. It is well-known that a coating material to be applied by brush is necessarily different from one intended for spray or dip application.

A sample of this final coating was applied by brush to a concrete surface and dried tack-free in fifteen minutes. It was hard enough to withstand light foot traffic within two hours. A further portion of this mixture was compounded for spray application and applied by spray-gun to sand-blasted steel test panels. The film dried tack-free in less than ten minutes and cured in two to three hours to a tough, abrasion-resistant, adherent film.

From the above discussion it will be apparent to one skilled in the art that the method of this invention is capable of wide variation. The examples are intended only for purposes of illustration and not as limits on the scope of the claims.

I claim:

1. A method of producing a solution of a polyfuran resin comprising diluting a mixture of furfural and furfuryl alcohol containing from about 20% to 70% by weight of furfural with from about 15% to 25% by weight of a ketonic solvent based on the weight of the furfural and furfuryl alcohol, polymerizing the ingredients in the presence of a proton donor catalyst while holding the mixture between about 55° C. and 90° C. until the mixture approaches incipient gelation, and then quenching the reaction by the addition of from about 60% to 120% by weight of additional ketonic solvent based on the weight of the furfural and furfuryl alcohol.

2. A method of producing a solution of a polyfuran resin comprising diluting a mixture of furfural and furfuryl alcohol containing from about 20% to 70% by weight of furfural with from about 15% to 25% by weight of a ketonic solvent based on the weight of the furfural and furfuryl alcohol, polymerizing the ingredients in the presence of a mineral acid catalyst while holding the temperature between about 55° C. and 90° C. until the mixture reaches incipient gelation, and then quenching the reaction by the addition of from about 60% to 120% by weight of additional ketonic solvent based on the weight of the furfural and furfuryl alcohol.

3. A method of producing a solution of a polyfuran resin comprising dissolving from about 0.5% to 10% by weight of a polyvinylacetal in a mixture of furfural and furfuryl alcohol containing from about 20% to 70% by weight of furfural, diluting the mixture with from about 15% to 25% by weight of a ketonic solvent based on the weight of the furfural and furfuryl alcohol, polymerizing the mixture in the presence of a proton donor catalyst while holding the temperature of the mixture between about 55° C. and 90° C. until the mixture approaches incipient gelation, and then quenching the reaction by the addition of from about 60% to 120% by weight of additional ketonic solvent based on the weight of the furfural and furfuryl alcohol.

4. A method of producing a solution of a polyfuran resin comprising dissolving from about 0.5% to 10% by weight of a polyvinylacetal in a mixture of furfural and furfuryl alcohol containing from about 20% to 70% by weight of furfural, diluting the mixture with from about 15% to 25% by weight of a ketonic solvent based on the weight of the furfural and furfuryl alcohol, polymerizing the mixture in the presence of a mineral acid catalyst while holding the temperature between about 55° C. and 90° C. until the mixture reaches incipient gelation, and then quenching the reaction by the addition of from about 60% to 120% by weight of additional ketonic solvent based on the weight of the furfural and furfuryl alcohol.

5. The method of claim 3 where the polyvinylacetal is polyvinylformal.

6. The method of claim 3 where the polyvinylacetal is polyvinylacetal.

7. The method of claim 3 where the polyvinylacetal is polyvinylbutyral.

8. The method of claim 3 where the polyvinylacetal is polyvinylfurfural.

9. The method of claim 4 where the polyvinylacetal is polyvinylformal.

10. The method of claim 4 where the polyvinylacetal is polyvinylacetal.

11. The method of claim 4 where the polyvinylacetal is polyvinylbutyral.

12. The method of claim 4 where the polyvinylacetal is polyvinylfurfural.

13. A furan resin solution formed by the method of claim 1.

14. A furan resin solution formed by the method of claim 3.

15. A furan resin solution formed by the method of claim 5.

16. A furan resin solution formed by the method of claim 6.

17. A furan resin solution formed by the method of claim 7.

18. A furan resin solution formed by the method of claim 8.

References Cited in the file of this patent

UNITED STATES PATENTS

| | | |
|---|---|---|
| 2,095,250 | Heberer | Oct. 12, 1937 |
| 2,267,830 | Lewis | Dec. 30, 1941 |
| 2,366,049 | Payne et al. | Dec. 26, 1944 |
| 2,432,623 | Kauth | Dec. 16, 1947 |